W. C. POOLE.
Compass.
No. 1,707.
Patented July 31, 1840.
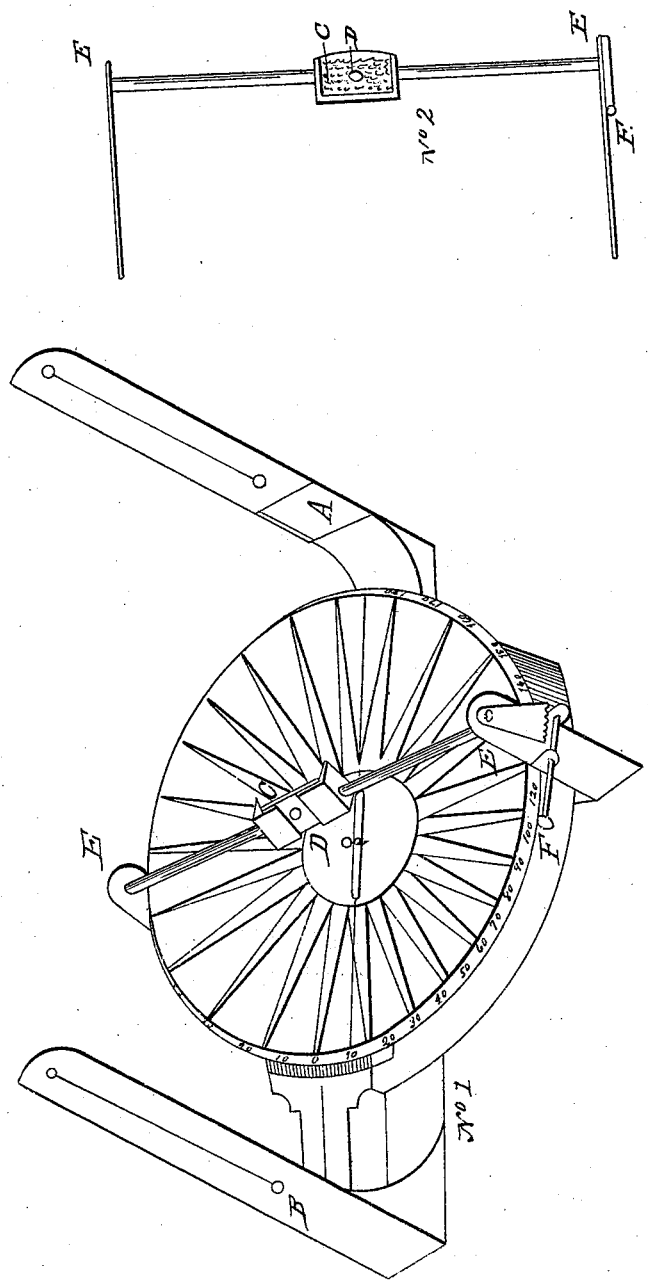

UNITED STATES PATENT OFFICE.

WM. C. POOLE, OF LANCASTER, PENNSYLVANIA.

MARINER'S AND SURVEYOR'S COMPASS FOR ASCERTAINING THE VARIATIONS OF THE NEEDLE.

Specification of Letters Patent No. 1,707, dated July 31, 1840.

*To all whom it may concern:*

Be it known that I, WILLIAM C. POOLE, of Lancaster city, in Lancaster county and State of Pennsylvania, have invented a new and improved Mode of Observing Variations of Compasses.

The nature of my invention consists in a fixture, to be attached to either a surveyor's or mariner's compass, by means of which the obsolute variation may be ascertained by the meridian sun. This fixture is provided with reflectors, one movable, placed at right angles with the sights of the compass, and the other stationary, attached to one of the sight vanes; in which an observer may, by the action of the moving reflector, see the sun at meridian.

To enable others skilled in the art to make and use my invention, I will proceed to describe its construction and operation.

I take a surveyor's or mariner's compass, constructed in any of the known forms, and I make a reflector and attach it to one of the sight vanes as at A, by means of two small screws fixed in the lower end of the case of the reflector. In the opposite sight vane I make a sight at B, to place the line of sight, or observation, parallel to the plane of the compass; in this sight I place a screen glass, represented by the sight hole B. This glass is of a reddish color and serves to absorb the rays of the sun, and protects the eye. I then make a concentric moving reflector C for which I use quicksilvered glass, silver or any other metal that will receive a suitable polish, and not attract the needle. The pivots of this reflector are carried by pillars which are fixed to the base of the compass, so as to give the reflector a horizontal motion in common with the compass when moved upon its socket. By this motion the horizontal plane of the reflector is kept at right angles with the line of the incident ray, during the process of an observation. Its vertical motion is to be used for bringing the sun's image from any elevation down to the horizon of the instrument, and is produced by means of the tangent screw F. This screw is constructed in the same manner in which any other tangent screw is constructed, and is attached to the right hand pillar by means of stationary bearings. A small arm is fixed on the end of the right hand pivot, the lower end of which arm is forty-five degrees of a circle, with its edge cut in notches to fit on the thread of the screw. Then by turning the screw from left to right the inclination of the plane of the reflector is produced. I make an aperture or sight D, in its center by which the lines of observation, and the line of the meridian are made conjunct parallels. This aperture is intended also to throw a shadow upon the image of the sun in the reflector A, around which (when the above named lines are in their conjunct position) will be a slender luminous ring, which will quickly show the slightest motion of the sun in altitude. This reflector moves on pivots set in pillars at E, E, with its plane at right angles with the line of sight, or observation, and the center of its aperture accurately in said line.

I use the compass with these appendages, to find the variation by the meridian sun, in the following manner. If the sun comes to the meridian south of the zenith I turn the vane containing the reflector A to the south, about ten or fifteen minutes before meridian, and move it toward the east until it is accurately under the sun. Then I look through the sight B, and turn the reflector C, by means of the screw F, until I see the sun's image in the reflector A, with the shadow of the aperture D, covering it similar to an annular eclipse. I continue to look, and as I observe the sun's image rise above said shadow and appear to the west of it, I move the reflector C, to keep it down from time to time, and move the vane next to my eye toward the east, until the sun becomes stationary; and as soon as I observe it to fall below said shadow the observation is ended. Then the lines in which the sun's image is seen in the front reflector A, through the center of the sun's image in the concentric moving reflector C, is the meridian of the place of observation; and the angle which said line makes with the line in which the pawls of the needle lie is the variation in all cases.

When the compass is set on the stand, loose the bottom screw, so as to permit the bowl of the compass to turn, then when the needle has settled bring the O, on the graduated circle accurately over the north pole of the needle, and then screw the bowl tight again, when you proceed to make the observation in the manner described in the specification, and the vernier will show the variation in degrees and minutes.

No. 1, instrument in perspective; No. 2, moving reflector with its fixtures.

What I claim as my invention and discovery, and desire to secure by Letters Patent, is—

The method herein described of obtaining the meridian line and thereby ascertaining the variation of the needle by means of a compass constructed with a fixed and movable reflector, and operating substantially in the manner set forth.

WILLIAM C. POOLE.

Witnesses:
SAML. DALE,
LEAH L. DALE.